United States Patent Office 3,529,028
Patented Sept. 15, 1970

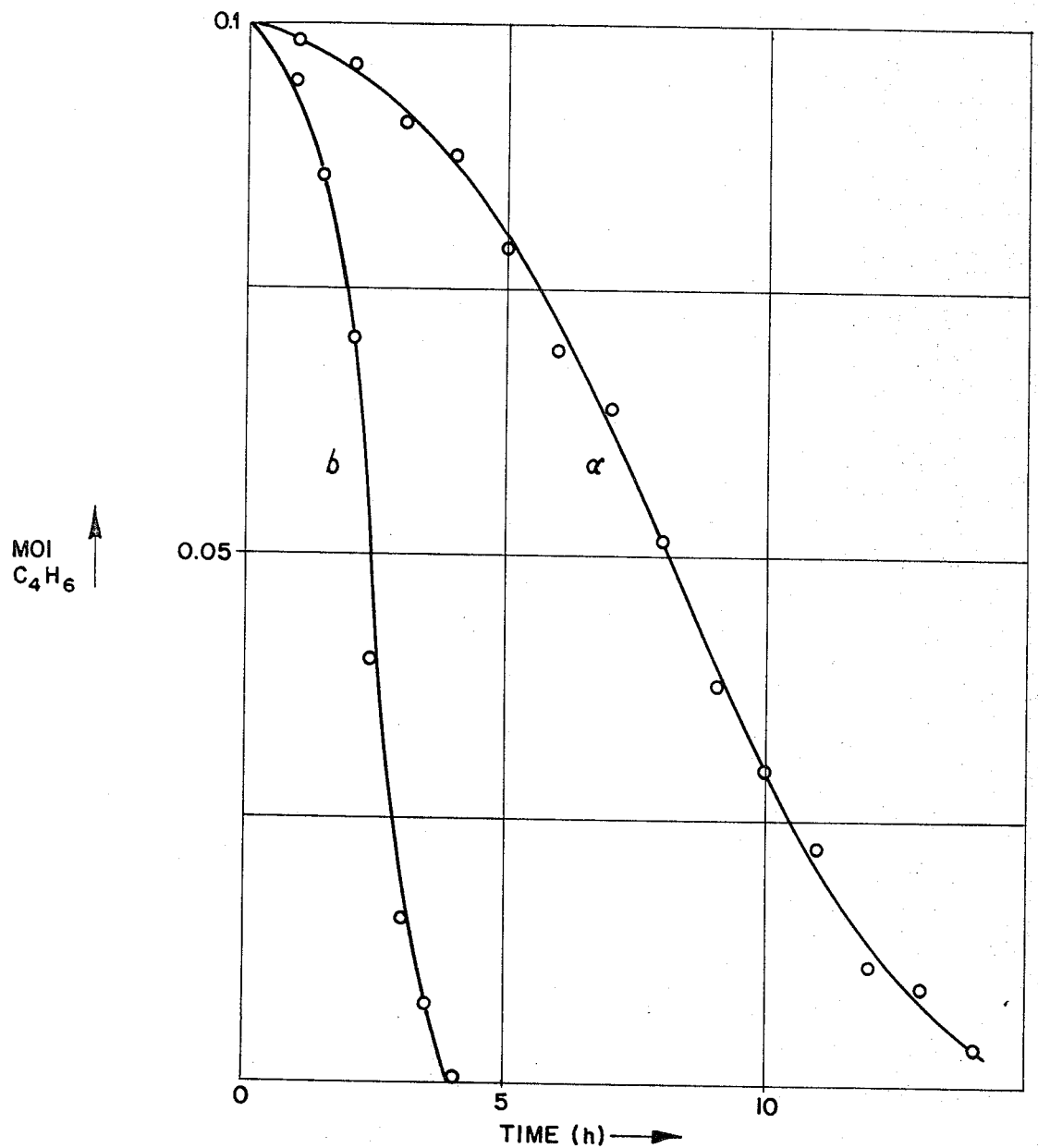

---

3,529,028
PROCESS FOR THE CYCLOTRIMERIZATION OF BUTADIENE FOR OBTAINING CYCLODODECATRIENE-(1,5,9)
Hans Baltz and Wilhelm Pritzkow, Leuna, and Harald Schmidt, Merseburg, Germany, assignors to VEB Leuna Werke Walter Ulbricht, Leuna, Germany
Filed Mar. 11, 1968, Ser. No. 711,997
Int. Cl. C07c 5/00
U.S. Cl. 260—666                                5 Claims

ABSTRACT OF THE DISCLOSURE

Process for the cyclotrimerization of butadiene for obtaining cyclododecatriene-(1,5,9) in the presence of catalysts containing zero valent nickel, wherein a co-catalyst is used in the reaction mixture, said co-catalyst consisting of an organic sulfoxide in an amount ranging from about 0.1 to about 7.5 mols per mol of the zero valent nickel compound.

---

This invention relates to a method for the cyclotrimerization of butadiene to cyclododecatriene-(1,5,9) in the presence of catalysts which contain zero valent nickel.

It is known to convert butadiene to cis-trans-trans cyclododecatriene-(1,5,9) by using catalyst systems consisting of titanium compounds and organometal compounds, particularly aluminum alkyls.

It is also knwon that compounds of zero valent or zero charge nickel will cyclotrimerize butadiene in the absence of complex-forming co-catlysts, forming thereby trans-trans-trans cyclododecatriene-(1,5,9). In the presence of complex-forming co-catalysts, however, for instance in the presence of phosphines, triaryl phosphites or triaryl arsenites, compounds of zero valent nickel will cause cyclodimerization of butadiene, and cyclooctadiene-(1,5) is obtained with a high degree of selectivity.

It is further known that complex-forming compounds which do not contain phosphorus or arsenic as donor centers, e.g. tetrahydrofurane, nitrobenzene, or dimethylsulfoxide, will inhibit the cyclooligomerization of butadiene by zero charge nickel, so that only purely thermal dimerization will occur with formation of vinyl-cyclohexene.

It is the object of the present invention to accelerate the cyclotrimerization of butadiene with formation of cyclododecatriene-(1,5,9) in the presence of catalysts containing zero valent nickel by the addition of a co-catalyst.

Other objects and advantages of the present invention will become apparent from the following detailed desciption.

The above objects are accomplished, according to the invention, by adding to the reaction mixture containing butadiene and zero valent nickel as co-catalyst an organic sulfoxide in an amount ranging from about 0.1 to about 7.5 mols per mol of the nickel compound used.

Contrary to the findings published in the literature, it has surprisingly been found that organic sulfoxides will not inhibit the cyclotrimerization of butadiene effected by the zero valent nickel compound as a catalyst, but that they considerably accelerate the same, when the molar ratio of sulfoxide and nickel compound is maintained within the range defined by the invention. When carrying out the process according to the invention, the sulfoxides used may be of great structural variety, as will appear from Table 3 in Example 3 hereinbelow.

While an organic sulfoxide in general may be employed in the process according to the invention, the sulfoxides are preferably of the general formula

R'—SO—R"

wherein R' and R" are each an aliphatic or cyclic, saturated or unsaturated hydrocarbon radical, or R' and R" together define a saturated or unsaturated hydrocarbon chain which together with the S atom of the sulfoxide group defines a hetero-ring.

As reaction product of the process according to the invention, we obtain trans-trans-trans cyclododecatriene-(1,5,9) with high selectivity; the cis-trans-trans compound is formed simultaneously in a small amount.

A very satisfactory catalyst containing zero charge nickel is bisacrylonitrile nickel; as sulfoxide, we preferably use dimethyl or diethyl sulfoxide. The preferred molar ratio of co-catalyst to catalyst is 1:1 to 5:1.

The reaction temperature is preferably in the range of from room temperature (about 20° C.) to about 150° C. and most preferably about 80 to about 120° C.

In the following, the invention will be more fully described in a number of examples, reference being also made to the accompanying diagram, but it should be understood that these are given by way of illustration and not of limitation and that many changes in the details can be made without departing from the spirit of the invention.

When not otherwise stated, percentages are weight percentages.

EXAMPLE 1

A test series "a" was conducted in which 13 ampules were each filled with 54 mg. bisacrylonitrile nickel and 5.4 g. butadiene. The ampules were introduced into an oil bath where they were shaken at a temperature of 100° C. At certain intervals, one ampule was taken out and the amount of still remaining butadiene was determined. The results are shown in curve a of the accompanying diagram. In a second test series "b" seven ampules were filled and treated exactly in the same manner as in series "a," however, to each ampule, 25.5 mg. dimethyl sulfoxide were also added. Again the ampules were shaken in an oil bath at 100° C. and after certain intervals, specimens were taken and analyzed. The results are shown in curve b, the accompanying diagram.

Upon comparing the two curves it becomes obvious that the addition of dimethylsulfoxide considerably accelerates the reaction. Gas-chromatographic analysis of the reaction products at the end of each series shows their composition to be as follows; see Table 1.

TABLE 1

| Reaction product, percent | Series a | Series b |
|---|---|---|
| n-Octatriene | 8 | 4 |
| Vinylcyclohexene | 8 | 7 |
| Cyclooctadiene-(1,5) | 9 | 6 |
| Trans-trans-trans-cyclododecatriene-(1,5,9) | 65 | 76 |
| Cis-trans-trans-cyclododecatrine-(1,5,9) | 10 | 7 |

EXAMPLE 2

The same work was carried out in ampules as described in Example 1, with the same amounts of bisacrylonitrile nickel and butadienes; however, varying amounts of dimethylsulfoxide were added. All the ampules were taken out of the oil bath after 3 hours and the conversion of butadiene obtained in each case was determined. The results are shown in Table 2. It may be seen that dimethylsulfoxide inhibits the reaction only when the molar ratio of the sulfoxide to the bisacrylonitrile nickel exceeds 8.

TABLE 2

| Molar Ratio Dimethylsulfoxide: Bisacrylonitrile-Nickel: | Conversion after 3 hrs. |
|---|---|
| 0 | 10 |
| 0.5 | 60 |
| 1 | 70 |
| 2 | 72 |
| 3 | 70 |
| 5 | 70 |
| 8 | 10 |
| 10 | 0 |

In all tests reported in Table 2, the reaction product contained 65–75% trans-trans-trans cyclododecatriene-(1,5,9), calculated on butadiene used.

EXAMPLE 3

The same tests were made as in series "b" of Example 1, but instead of dimethylsulfoxide, other sulfoxides were added in equivalent amounts, i.e. 1 mol sulfoxide per mol bisacrylonitrile nickel. All ampules were taken out of the oil bath and their contents analyzed. The results are shown in Table 3.

TABLE 3

| R'—SO—R'' R' R'' | Conversion after 3 hours (percent) | Trans-trans-trans-cyclodo-decatriene-(1,5,9) (percent) |
|---|---|---|
| Methyl—Methyl | 70 | 76 |
| Ethyl—Ethyl | 70 | 70 |
| Methyl—i-Propyl | 45 | 75 |
| n-Butyl—n-C$_8$H$_{17}$ | 45 | 58 |
| Methyl—Phenyl | 25 | 71 |
| —(CH$^2$)$_4$— | 20 | 61 |
| No sulfoxide added | 9 | 66 |

The sulfoxide in the penultimate line of column 1 has the formula

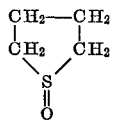

EXAMPLE 4

An autoclave was filled with 216 g. butadiene, 6 g. bisacrylonitrile nickel and 3 g. dimethylsulfoxide. Heating was carried out for 4 hours to 100° C. After cooling and opening of the autoclave, 188 g. of a liquid product were obtained, 175 g. of which could be distilled off. The distillate was analyzed gas-chromatographically; it contained 5% octatriene, 7% vinyl cyclohexene, 7% cyclooctadiene-(1,5), 75% trans-trans-trans cyclododecatriene-(1,5,9) and 6% cis-trans-trans cyclododecatriene-(1,5,9).

Using similar reactants, but working without the addition of dimethylsulfoxide, only 10 g. of a liquid product were obtained, which could not be distilled.

The foregoing disclosure relates only to preferred embodiments of the invention which is intended to include all changes and modifications of the examples described within the scope of the invention as set forth in the appended claims.

What is claimed is:

1. In a process for cyclotrimerizing butadiene for producing cyclododecatriene-(1,5,9) by contacting butadiene with a zero valent nickel compound as catalyst, the improvement which comprises conducting said process with an organic sulfoxide as co-catalyst, in an amount of from about 0.1 to about 7.5 mols per mol of said catalyst.

2. Process according to claim 1, wherein said sulfoxide has the formula

R'—SO—R'' wherein R' and R'' are each a member selected from the group consisting of saturated and unsaturated aliphatic and cyclic hydrocarbon radicals and when taken together with the S atom of the sulfoxide group a member selected from the group consisting of saturated and unsaturated heterocyclic radicals.

3. Process according to claim 1 wherein said co-catalyst is a member selected from the group consisting of dimethyl sulfoxide and diethyl sulfoxide.

4. The process according to claim 1, wherein the catalyst containing zero valent nickel is bisacrylonitrile nickel.

5. The process according to claim 1, wherein the molar ratio of the co-catalyst to the catalyst is between 1:1 and 5:1.

References Cited

UNITED STATES PATENTS

| 3,076,045 | 1/1963 | Schneider. |
| 3,149,173 | 9/1964 | Wittenberg. |
| 3,249,641 | 5/1966 | Storrs. |

DELBERT E. GANTZ, Primary Examiner

V. O'KEEFE, Assistant Examiner